United States Patent [19]

Brackett et al.

[11] Patent Number: 4,905,400
[45] Date of Patent: Mar. 6, 1990

[54] CONTOURED SPINNING ROD AND HANDLE ASSEMBLY

[76] Inventors: John E. Brackett, 7226 Thomas Ave. S., Minneapolis, Minn. 55423; Larry J. Dahlberg, R.R. 9, Brainerd, Minn. 56401; Steven W. Vogts, 2600 Joshua Ave., Broken Arrow, Okla. 74012

[21] Appl. No.: 332,472

[22] Filed: Apr. 3, 1989

Related U.S. Application Data

[63] Continuation-in-part of Ser. No. 104,093, Oct. 5, 1987, Pat. No. 4,817,324.

[51] Int. Cl.⁴ ............................................. A01K 87/00
[52] U.S. Cl. ...................................... 43/23; D22/142
[58] Field of Search ................... D22/142; 43/18.1, 23

[56] References Cited

U.S. PATENT DOCUMENTS

| | | | |
|---|---|---|---|
| D. 300,167 | 3/1989 | Andreasen et al. | D22/142 |
| 1,931,303 | 10/1933 | Sturgis | 43/23 |
| 2,116,158 | 5/1938 | Pontis | 43/23 |
| 4,697,377 | 10/1987 | Martin | 43/23 |
| 4,817,324 | 4/1989 | Brackett et al. | 43/18.1 |

Primary Examiner—M. Jordan
Attorney, Agent, or Firm—Moore & Hansen

[57] ABSTRACT

A contoured reel seat segment for a spinning type fishing rod which is formed to comfortably fit against the fisherman's hand grip thumb and finger positions where they grasp the reel seat segment forward of the spinning reel's main attachment stem. Force resistant inclined surfaces are formed on the reel crank side of the reel seat segment and on the bottom of the reel seat segment to advantageously increase the surface contact from the user's thumb and fingers to the reel seat segment of the spinning rod handle. The force resistant inclined surfaces can be concave surfaces, can be formed on a portion of the reel seat segment which protrudes laterally and outwardly towards the reel's crank, and can also be in the form of angularly disposed concave indents for the user's thumb and large finger. The force resistant inclined surfaces provide mechanical advantage for the user's thumb and fingers to resist and engage upward and downward rod forces which exert on a spinning rod reel seat in the act of fishing.

15 Claims, 1 Drawing Sheet

CONTOURED SPINNING ROD AND HANDLE ASSEMBLY

This application is a continuation-in-part of Application Ser. No. 07/104,093 filed on Oct. 5, 1987 and issued as U.S. Pat. No. 4,817,324 on Apr. 4, 1989.

BACKGROUND OF THE INVENTION

The aforesaid copending application, Ser. No. 07/104,093, discloses a fishing rod and reel assembly wherein the reel is laterally offset towards the crank side of the reel, which improves user grip comfort and mechanical advantage by reducing the lateral grip distance from the palming side of the reel to the buttgrip of the rod handle.

The copending application also discloses an upward force-resistant inclined surface on the top of the palming side of the handle which improves the fisherman's ability to engage, resist, and control leveraged upward rod forces acting on the handle. Such upward rod forces are the result of downward forces on the rod tip caused by fish and lure action acting through a lever arm extending from a pivot point in the area of the reel seat outwardly along the rod tip.

The spinning rod and handle construction disclosed herein is directed to improving the ability of the user to effectively hold the handle and reel seat of a spinning rod in such a way as to counter and control both upward and downward forces acting on a spinning rod handle when casting and fishing with a spinning rod and reel.

The spinning rod problem is that the fisherman's hand grip on a spinning rod handle must counter both upward and downward forces while simultaneously holding the buttgrip, the reel seat, and the line extending from the front of the spinning reel.

A spinning rod is a lever and the pivot point of the lever is located in the area of the user's hand grip on the reel seat. In the act of using a spinning rod, upward and downward forces are exerted on the user's hand from the spinning rod lever. Upward forces are exerted against the user's palm on the top of the buttgrip; downward forces are exerted against the user's fingers on the bottom of the reel seat, and upward forces are exerted against the user's thumb on the top of the reel seat.

The problem is that the user's index finger must be free to manipulate and control the line extending from the front of the spinning reel, and as a result the user's index finger cannot always grasp the handle, and the user's other finger's and thumb have to counter the upward and downward forces. The problem with existing spinning rod handles and reel seats is that they make inadequate provision for the manner in which the user's thumb and fingers contact a spinning rod reel seat, and for the shape, location, and angular disposition of the user's thumb and fingers when they grasp a spinning rod reel seat. The outer surface of the user's fingers and thumb are curved, and little or no provision is employed in current reel seat design to accommodate finger and thumb curvature where they contact the top and sides of a spinning rod reel seat, and engage fishing rod forces.

Traditional spinning rod reel seats are generally symetrically formed in the hand grip area with no provisions for the eccentric contours and force-engaging needs of the user's grip on the reel seat.

U.S. Pat. No. 4,014,129 to Capra shows the hand grip on a spinning rod reel seat, and in particular the thumb and large finger location and their angular disposition but shows no reel seat contouring to accommodate such a grip. The Capra patent addresses force problems on spinning rods with a rear portion of the buttgrip which is formed to fit against the user's arm, but the Capra design shows no provisions of any kind for upward and downward force exerted from the reel seat on the user's thumb and finger's which grasp the reel seat.

U.S. Pat. No. 2,826,852 to Wardrip also shows the user hand grip on a spinning rod reel seat. Wardrip shows finger indents on the bottom area of the reel seat but the finger indents show no angular disposition. The top and sides of the Wardrip reel seat design provide no contouring of any kind for the lateral position of the user's thumb and it's contact against the top and side of the reel seat area.

U.S. Pat. No. 4,631,853 to Brackett et al addresses fishing rod force problems and discloses a buttgrip forward portion and a rear reel seat segment which merge together in the form of a laterally outward protrusion; but that patent discloses no lateral offsetness or contouring on the reel seat segment of a spinning rod where the user's thumb and large finger grasp and contact a spinning rod reel seat.

U.S. Pat. No. 4,697,376 to Brackett et al addresses upward force problems on fishing rods and discloses laterally offset buttgrips, a laterally offset rear reel seat segment, and buttgrip cross sections that are canted and have a contoured recess. Finger-gripping recesses are also disclosed on the underside of the butt grip and reel seat. However, again, there is no disclosure of contouring or lateral offsetness on the portion of a spinning rod reel seat where the user's large finger and thumb grip the reel seat. Neither Brackett patent '853 nor any known prior art discloses contouring of any kind on the reel crank side of the reel seat.

Design patent Ser. No. 300,167 to Andreasen shows a cosmetic contour, on the side of the buttgrip of a casting rod handle, which appears to be in the form of finger indents having some angular form. Andreasen's design is only on the side of the buttgrip portion of the handle and he discloses no contouring or form which would add comfort or mechanical advantage to the top or bottom of a fishing rod handle where the user's grip encounters upward or downward fishing rod forces. Andreasen's casting rod buttgrip has no application to a spinning rod reel seat and in particular to the spinning rod problems addressed by the disclosed invention regarding the lateral location of the user's thumb on the forward portion of a spinning rod reel seat.

The spinning rod, handle, and reel assembly disclosed herein have been specifically contoured and constructed to meet the fisherman's need for an improved spinning rod reel seat so as to resist upward and downward forces with the thumb and large finger on the top, bottom, and reel crank side of the reel seat.

BRIEF SUMMARY OF THE INVENTION

The primary objective of this invention is to form and contour a spinning rod handle and reel seat to comfortably fit the user's hand grip on a spinning rod, handle, and reel assembly, and in particular to give the user's hand grip a mechanical advantage in engaging, resisting, and controlling upward and downward leveraged rod forces.

A particular objective of this invention is to form the reel seat of a spinning rod to fit against the angular dispositions and natural curvatures of the thumb and large finger of the hand grip of the fisherman.

Another objective of this invention is to form the reel crank side of a spinning rod reel seat to comfortably give the user thumb leverage in encountering upward forces.

Yet another object of this invention is to form the outer surfaces of a spinning rod reel seat to comfortably and more fully contact the curved surfaces and the inclined surfaces of the user's hand, thumb, and fingers.

These objectives are realized on spinning rod assemblies employing either right or left hand cranking reels, and can be realized on different fishing rod constructions such as blank through constructions having the rod shaft extending into the butt grip, fat butt constructions where the rod shaft expands to a larger diameter and partially forms the reel seat, and on assemblies where the rod shaft is ferruled or otherwise suitably connected to the handle.

In a preferred embodiment of this invention, a portion of the reel seat has a force-resistant, inclined surface on the reel crank side of the reel seat. This is the area of the reel seat which bears against the user's thumb and it is this portion of the reel seat which exerts upward forces against the user's thumb when the user executes a back-cast as part of his casting motion. The inclined surface results in more reel seat surface contacting the surface of the user's thumb. The increased reel seat to thumb contact area gives the user's thumb a mechanical advantage in resisting upward rod forces which exert against the thumb.

As a further beneficial feature, the inclined surface may be formed on a lateral extension of the reel seat, which extends outwardly towards the crank of a spinning reel. The contact against the user's thumb is comfortably increased by such a structure, thus proving more mechanical advantage in engaging upward rod forces which exert against the user's thumb. Forming the inclined surface as a concave recess further increases user comfort and force resistance.

In a particular embodiment of this invention, the inclined surface on the reel crank side of the reel seat is combined with a force-resistant inclined surface on the palming side of the forward end of the buttgrip. The buttgrip is located behind the reel seat and the palming side of the buttgrip is the side opposite from the reel's crank. The force-resistant, inclined surface on the palming side of the buttgrip contacts the user's rear palm when the user's hand simultaneously grasps the buttgrip and the reel seat, such as when the user executes the forward part of a casting motion. During the forward cast, upward force exerts from the buttgrip to the user's palm and the force-resistant, inclined surface on the palming side of the buttgrip increases the contact between the buttgrip and the user's rear palm. This results in a mechanical advantage for the user in engaging upward rod force.

In a particularly advantageous embodiment of this invention, the aforesaid inclined surface on the reel crank side of the reel seat, is angularly disposed to match the user's thumb position on the top and side of the reel seat. The angularly disposed thumb indent conforms to the grip position of the user's thumb in that it angles forwardly and outwardly along the top and side of the reel seat. Maximum grip conformity and mechanical advantage for the user's thumb is achieved with this embodiment, which can include an outside portion of the inclined thumb indent surface on its outer edge which extends upwardly to comfortably fit against the side of the user's thumb.

Another feature of this invention provides the user's large or second finger with comfort and mechanical advantage on the bottom of the reel seat where the user's large finger engages downward rod forces, such as when setting the hook. To that end, the bottom surface of the reel seat, on the reel crank side, is formed with a force-resistant, inclined surface which can be concave, and which is preferably formed on a portion of the reel seat which is located forwardly of the reel's main stem by which the reel is attached to the reel seat. This inclined surface may be on the aforesaid lateral extension of the reel seat. Such a force-resistant inclined surface increases reel seat to finger contact and comfortably provides a mechanical advantage for the user to engage downward rod forces with his large finger on the bottom and reel crank side of the reel seat. This inclined surface can also be most advantageously formed as an angularly disposed concave finger indent which angles outwardly and forwardly along the bottom and side of the reel seat. The angularly disposed finger indent greatly increases finger to reel seat contact, as the angular disposition conforms to the natural finger position of the user as the finger grips the bottom and side of the reel seat.

These and other objects and advantages of the invention will be readily understood as the following description is read in conjunction with the accompanying drawings, wherein like reference numerals have been utilized to designate like elements throughout the several views.

DESCRIPTION OF THE PREFERRED EMBODIMENT

Figure 1:
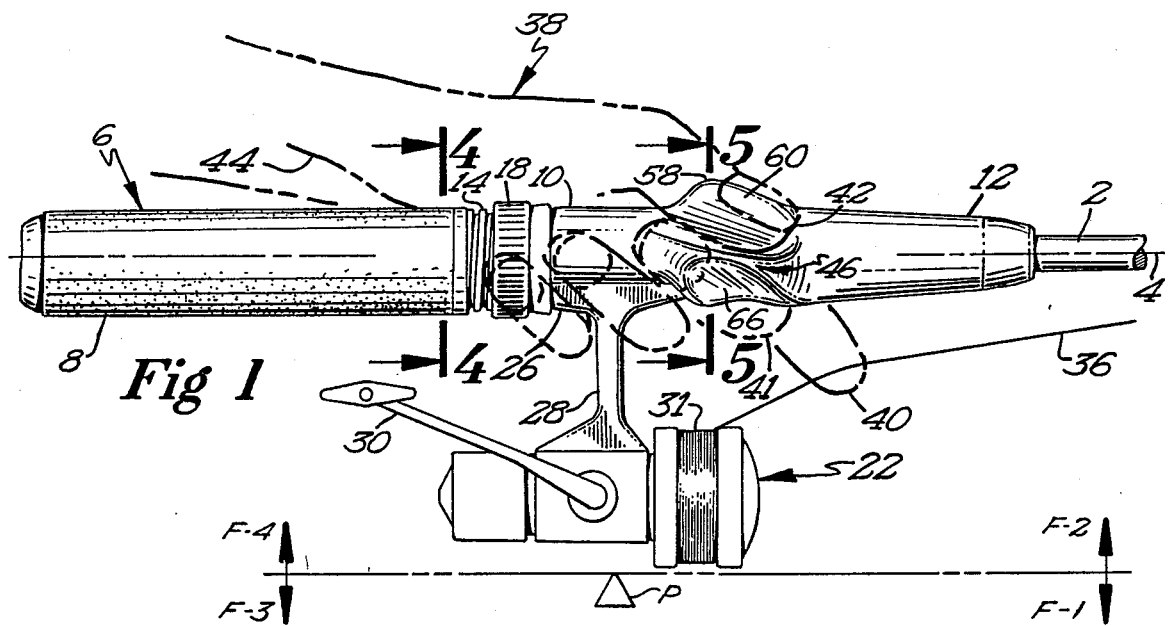
FIG. 1 is a side elevation view of the spinning rod and handle assembly of this invention.
Figure 2:
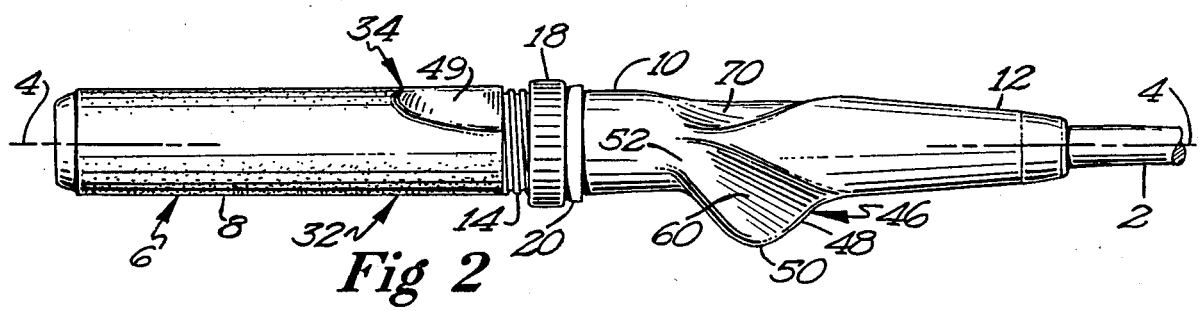
FIG. 2 is a top, plan view of the spinning rod and handle assembly of FIG. 1.

Referring now to the drawings, there is shown in FIGS. 1-5 a preferred embodiment of the improved spinning rod and handle of this invention. The rod and handle as most clearly shown in FIGS. 1 and 2 is of the spinning type which is adapted to have a spinning type of reel mounted to the reel seat on the bottom of the handle.

Figure 3:
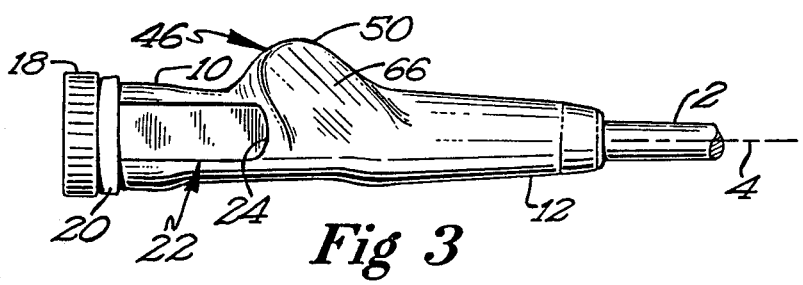
FIG. 3 is a bottom, plan view of the reel seat segment of the spinning rod and handle assembly of FIG. 1.

As shown in FIGS. 1-3, the spinning rod and handle assembly is comprised of a rod shaft 2, and a handle generally indicated by reference numeral 6. The handle 6 is comprised of a butt grip segment 8 and a reel seat segment 10. A foregrip segment 12 is positioned forward of reel seat 10 and may be formed as an integral, one piece structure therewith as shown. Rod shaft 2 and handle 6 can be made from any suitable material. Rod shaft 2 would preferably be made of graphite and buttgrip 8 and reel seat 10 would be molded or shaped from plastic or any other suitable material. As shown in FIG.

1, spinning reel 22 is mounted under reel seat 10, and is connected to reel seat 10 by a main reel stem 28 and a reel attachment foot 26. The bottom surface of reel seat 10 has a reel seat track 22 to accommodate reel attachment foot 26, as shown in FIG. 3. An undercut recess (not shown) to receive one end of attachment foot 26 is formed on the bottom of reel seat 10 and its location is referenced on FIG. 3 by numeral 24. The rear or opposite end of reel attachment foot 26 is locked to the assembly by a locking hood 20 and locking nut 18 which are located on the rear of reel seat 10 as shown. Locking nut 18 is positioned on reel seat threads 14. Handle 6 and its reel seat segment 10 have a longitudinal, central axis 4.

Spinning reel 22 has a reel crank 30 and a line spool 31, and the line extends torwardly from reel 22 as shown in FIG. 1 by reference numeral 36. FIG. 1 shows a fisherman's handgrip in phantom 38 grasping handle 6 and indicates the position of the user's rear palm 44 on top of buttgrip 8. The position of user's thumb 42 on top of reel seat segment 10, of the user's index finger 40 contacting the line 36, and of the user's large or second finger 41 grasping the bottom of reel seat 10 are also shown. The user hand grip in phantom 38 shows a common grip position and it should be noted that this invention also has benefits for hand grip positions which are located forwardly or rearwardly of the hand grip position described herein.

As shown in FIG. 1, reel crank 30 is located on the right side, from a rear or top view, and handle 6 and reel seat segment 10 are referenced herein as having a reel crank side 32 and a palming side 34. Reel crank side 32 is the side of handle 6 on which the reel crank 30 is located and palming side 34 is the opposite side of handle 6 and reel seat segment 10. The assembly shown in this application shows a right hand reeling assembly, with the left hand gripping the handle; however, it should be noted that all of the embodiments of this invention can be reversed and formed for left hand reeling assemblies.

The side elevation view of FIG. 1 illustrates diagrammatically how both upward and downward fishing rod forces act on the user's grip 38 from handle 6, buttgrip 8, and reel seat segment 10. A fishing rod is a lever and on a spinning rod assembly the pivot point P of the lever is generally located in the area of the reel 22 and the reel's main attachment stem 28. In the act of setting the hook on a fish, leveraged forces act downwardly at F-1 on the forward end of the rod, about a pivot point P created by the gripping action of the user's hand 38. As a result, upward forces F-4 are exerted against the user's rear palm 44 on the top of buttgrip 8 on the palming side 34 of the handle 6; and downward forces F-1 are exerted against the user's forward large finger 41 from the bottom of reel seat segment 10. Because the user's index finger 40 has to be free to manipulate the line 36, it is often the user's large or second finger 41 which bears and resists the downward force F-1 when setting the hook or casting with a spinning rod and handle assembly. In the backcast part of a casting motion, the force directions of the fishing rod lever reverse, and upward force F-2 is exerted against the user's thumb 42 on the top of reel seat segment 10 in the area of the upward bulge 58 shown in FIG. 1, and on the crank side 32 of the reel.

Figure 4:
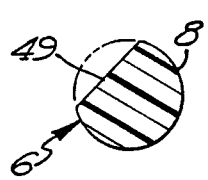
FIG. 4 is a vertical section view through the butt grip segment of the handle, taken along lines 4—4 of FIG. 1.

In a preferred embodiment of this invention, handle 6 is specifically formed to give the user's hand 38 a mechanical advantage in engaging and resisting upward forces F-2 and F-4, which act upwardly against the user's rear palm 44 and thumb 42. As shown in FIGS. 2 and 4, the palming side 34 of butt grip 8 is formed with force-resistant, inclined surface 49. Surface 49 permits the user's palm 44 to resist upward force F-4 and is comparable in shape and function to a similar surface shown in FIG. 21 of copending Application Ser. No. 07/104,093.

Figure 5:
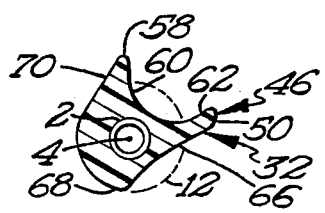
FIG. 5 is a vertical section view through the handle, taken along lines 5—5 of FIG. 1.

In this embodiment, force-resistant, inclined surface 49 on the palming side 34 of buttgrip 8 is combined with a force-resistant, inclined surface 60 on the reel crank side 32 of reel seat segment 10. Force-resistant, inclined surface 60 is located forward of the reel's main stem 28 and is shown in FIGS. 1, 2, and 5. Force-resistant, inclined surface 60 slopes downwardly and outwardly from the top of reel seat segment 10 in a direction towards reel crank 30. This structure forms a bottom portion 68 of the cross section of reel seat segment 10 as shown in FIG. 5. Force-resistant, inclined surface 60 supports and bears against user's thumb 42 and increases contact of thumb 42 against reel seat segment 10 and provides resistance to upward rod forces F-2 which exert on user thumb 42 at that location. An ideal form of force-resistant, inclined surface 60 is a concave contour as shown in FIG. 5.

In a specific embodiment of the improved fishing rod handle of this invention, reel seat segment 10 may be specifically formed to accommodate thumb 42 of the user. As can be seen by reference to FIG. 1, the user's thumb 42 will be positioned on the top and on the reel crank side 32 of reel seat segment 10. Inclined surface 60 serves as an indented thumb rest and support surface, in the manner shown in FIG. 1. In the specific embodiment shown, reel seat segment 10 is formed with a lateral outward protrusion 46 forwardly of the reel attachment stem 28. Lateral protrusion 46 extends laterally outwardly on the crank side 32 of the reel in a direction towards reel crank 30. Protrusion 46 conforms to the natural grip position of user thumb 42 and lies directly under thumb 42. This gives thumb 42 great support and mechanical advantage in resisting upward rod forces F-2, which act against thumb 42 along the top and reel crank side 32 of reel seat segment 10. As is indicated in FIG. 2, lateral, outward protrusion 46 is preferably laterally offset from longitudinal central axis 4 of rod shaft 2 and handle 6. Inclined, thumb rest surface 60 is preferably formed on lateral protrusion 46. However, an inclined surface, thumb support surface 60 may be formed on the top and side wall surface of the reel seat without the necessity of providing lateral projection 46. In the embodiment shown and described, the concave, inclined support surface 60 is formed as an angled thumb indent surface on lateral outward protrusion 46, and extends outwardly and forwardly from a rearward location 52 on reel seat segment 10 towards the outside edge 50 of outward protrusion 46. Inclined surface, angled thumb indent 60 gives the user's thumb 42 maximum thumb to reel seat surface contact and maximum force resistance against upward rod forces. It is to be noted that angled thumb indent, inclined support surface 60 and lateral, outward protrusion 46 can extend farther forwardly along reel seat segment 10, and vary in shape from the exact contour shown, without departing from the functional benefits recited herein.

Advantageously, the outer end of inclined surface, thumb rest indent 60 may turn upwardly at portion 62, as shown in FIG. 5. With surface 60 having a concave contour as shown, and angling upwardly and outwardly along its outer surface, it fits particularly snuggly against the user's thumb 42, in conforming relation thereto. The inclination of surface 62 may vary from that shown, and may be contoured so as to position outer edge 50 of lateral projection 46 at higher or lower locations than that shown.

If desired, the top of reel seat segment 10 may be further shaped in the form of an upward bulge 58 as shown in FIGS. 1 and 2. With such a contoured handle, the user can move his hand grip forwardly along handle 6 to a grip position wherein upward bulge 58 can rest comfortably inside of and against the inside palm of the user's hand. With such a gripping position, all of the user's fingers would be positioned forwardly of reel stem 28.

As a further beneficial feature, the bottom portion of reel seat segment 10, forwardly of reel stem 28, along the underside of lateral outward protrusion 46, is formed with a concave, force-resistant surface 66 as shown in FIGS. 1, 3, and 5. It is against force-resistant, inclined surface 66 that the user's large or second finger 41 engages and contacts the bottom of reel seat segment 10 so as to resist downward rod force F-1, as would occur in setting the hook and in other essential acts associated with fishing with a spinning rod. Concave, force-resistant surface 66 on lateral outward protrusion 46, gives the user's large finger 41 greatly increased finger to reel seat contact and significantly increases the user's ability to engage and resist downward rod forces.

Force-resistant, inclined surface 66 is further improved when it is formed as an angularly disposed finger indent on the bottom of reel seat segment 10 as shown. Finger indent, inclined support surface 66 angles upwardly and rearwardly from the underside of reel seat segment 10, to merge with outer edge 50 of lateral projection 46, as shown most clearly in FIGS. 3 and 5. Thus, finger indent, inclined surface 66 and thumb rest indent, inclined surface 60 are angularly disposed with respect to each other. Thus, with the user's hand 38 gripping the handle as shown in FIG. 1, the large, second finger 41 of the user will curl rearwardly and upwardly in secure, comfortable seating contact with inclined finger indent surface 66.

As is shown in FIGS. 2 and 5, the upper and palming side 34 of handle 6 may also be provided with an inclined, planar surface 70, which slopes downwardly and outwardly from upward bulge 58 on the top of the reel seat segment 10. Inclined surface 70 provides a comfortable rest surface for the forward portion of the user's palm to further assist in resisting forces on the rod shaft, when the user's hand 38 grips the handle as shown in FIG. 1.

Although the improved spinning rod and handle assembly has been set forth herein with respect to particular embodiments, it is anticipated that various changes and modifications may be made in the size, shape, construction and arrangement of the various elements and components of the rod and handle assembly without departing from the spirit and scope of the invention as defined by the following claims.

What is claimed is:

1. A spinning rod and handle assembly comprising:
a reel seat segment on said handle having a reel seat thereon;
an elongated handle secured to said rod shaft, said handle having a palming grip side on the side thereof opposite the side on which the crank of a spinning reel mounted on said reel seat will be located; and
a buttgrip segment on the rear end of said handle; and
an upward force-resistant inclined surface extending along the top of at least a portion of said palming grip side of said handle on said buttgrip, said inclined surface sloping downwardly and outwardly towards said palming grip side of said handle on said buttgrip, whereby a relatively large part of the user's palm may be positioned on top of said inclined surface to effectively resist leveraged upward rod forces acting on said handle and said buttgrip; and
said reel seat segment on said handle having a cranking side thereof on which the crank of a reel mounted on said reel seat segment will be located; and
an upward force resistant inclined surface extending along the top of at least a portion of said cranking side of said reel seat segment, said inclined surface sloping downwardly and outwardly towards said cranking side of said reel seat segment, whereby a relatively large part of the user's thumb may be positioned on top of said inclined surface to effectively resist leveraged upward rod forces acting on said reel seat segment of said handle when the thumb grips said reel seat segment.

2. A spinning rod and handle assembly comprising:
an elongated handle secured to said rod shaft;
a reel seat segment on said handle having a reel seat thereon;
said reel seat segment and said handle having a cranking side on the side of said handle and said reel seat segment on which the crank of a spinning reel mounted on said handle will be located; and
an upward force-resistant inclined surface extending along the top of at least a portion of said cranking side of said reel seat segment, said inclined surface sloping downwardly and outwardly towards said cranking side of said reel seat segment, whereby a relatively large part of the user's thumb may be positioned on top of said inclined surface to effectively resist leveraged upward rod forces acting on said reel seat segment of said handle when said thumb grips said reel seat segment.

3. A spinning rod and handle assembly as defined in claim 2 wherein:
said inclined surface is concave to comfortably contact said thumb of said user.

4. A spinning rod and handle assembly as defined in claim 3 wherein:
said inclined surface is on a portion of said reel seat segment located forwardly of a main shaft or stem of said spinning reel which attaches to said reel seat segment.

5. A spinning rod and handle assembly as defined in claim 4 wherein:
said reel seat segment has a palming side opposite said cranking side;
said reel seat segment has a central, longitudinal axis; and
said portion of said reel seat segment having said cranking side inclined surface is laterally offset from said reel seat central axis in a direction towards said reel crank, whereby the reel seat material on said crank side of said reel seat segment extends outwardly in a direction towards said reel crank, whereby said laterally offset portion of said reel seat segment serves as a support for the user's thumb, giving the user's hand grip force resistant leverage against fishing rod upward forces.

6. A spinning rod and handle assembly as defined in claim 5 wherein:

the bottom surface of said reel seat segment has an inclined, concave surface, from a rear prospective cross-sectional view, and said inclined, concave surface contacts said user's finger or fingers when said user's hand grasps the bottom of said reel seat segment.

7. A spinning rod and handle assembly comprising:
a rod shaft having a longitudinal central axis;
an elongated handle secured to said rod shaft;
a reel seat segment on said handle having a reel seat thereon, said reel seat segment having a cranking side thereof on the side of said reel seat segment on which the crank of a spinning reel will be mounted and said reel seat segment has an outward lateral protrusion extending outwardly in a direction towards said cranking side, whereby the thumb of the user's hand grip can rest against and on top of said outward protrusion to effectively resist fishing rod upward forces, and said cranking side of said outward protrusion has a concave, inclined surface on the top surface of said reel seat segment formed to fit against the user's thumb when grasping said reel seat segment.

8. A spinning rod and handle assembly as defined in claim 7 wherein:

said outward protrusion has a concave, inclined surface on the bottom surface of said reel seat segment formed to receive the finger of the user when grasping said reel seat segment.

9. A spinning rod and handle assembly as defined in claim 7 wherein:

said concave inclined surface on said top of said reel seat segment extends outwardly and forwardly in an angularly direction from a rear location on said reel seat segment, whereby said concave inclined surface is formed as an angularly disposed concave indented thumb rest which comfortably conforms to the natural position of the user's thumb when the user's hand grasps said handle and said reel seat segment on said handle.

10. A spinning rod and handle assembly as defined in claim 8 wherein:

said concave inclined surface on the bottom of said reel seat segment is angularly disposed with respect to said rod shaft longitudinal central axis and is formed to comfortably fit against the natural angular position of the user's fingers when the user's hand grasps said reel seat segment.

11. A spinning rod and handle assembly as defined in claim 9 wherein:

said inclined surfaces on the top and bottom of said reel seat segment are angularly disposed with respect to each other.

12. A spinning rod and handle assembly as defined in claim 8 wherein:

the top surface of said reel seat segment, adjacent to said concave indented thumb rest is formed with an upward bulge which comfortably fits against and into said user's palm when the hand of the user grasps said reel seat segment with all of the user's fingers positioned forwardly of a main stem of the spinning reel when attaches to said reel seat segment, and which fits between the user's thumb and forefinger when the user's hand is more rearwardly disposed on said handle.

13. A spinning rod and handle assembly as defined in claims 2 or 7 wherein said rod shaft is positioned within said reel seat segment.

14. A spinning rod and handle assembly as defined in claims 2 or 7 wherein a spinning reel is attached to said reel seat segment.

15. A spinning rod and handle assembly as defined in claim 7 wherein the outside top surface of said outward lateral protrusion angles upwardly to seat against the user's thumb.

* * * * *